United States Patent [19]

Aderer

[11] Patent Number: 4,925,248
[45] Date of Patent: May 15, 1990

[54] TRACK-ADJUSTING WHEEL

[75] Inventor: Peter Aderer, Koenigswinter-Thomasberg, Fed. Rep. of Germany

[73] Assignee: Lemmerz-Werke KGaA, Koenigswinter, Fed. Rep. of Germany

[21] Appl. No.: 270,612

[22] Filed: Nov. 14, 1988

[30] Foreign Application Priority Data

Dec. 9, 1987 [DE] Fed. Rep. of Germany ....... 3741640

[51] Int. Cl.$^5$ .............................................. B60B 3/00
[52] U.S. Cl. .................................. 301/9 TV; 301/11 R
[58] Field of Search ..................... 301/62, 63 R, 63 D, 301/10 R, 10 DC, 11 R, 9 R, 9 DN, 9 TV

[56] References Cited

U.S. PATENT DOCUMENTS

| 1,582,494 | 4/1926 | Wagenhorst | 301/10 DC |
| 2,171,170 | 8/1939 | Beckman | 301/11 R |
| 2,254,361 | 9/1941 | Frudden | 301/18 |
| 2,294,256 | 8/1942 | Uber | 301/9 TV X |
| 4,515,411 | 5/1985 | Taylor | 301/9 TV |

FOREIGN PATENT DOCUMENTS

| 0025677 | 1/1985 | European Pat. Off. . | |
| 837649 | 2/1957 | Fed. Rep. of Germany . | |
| 1048171 | 12/1958 | Fed. Rep. of Germany . | |
| 2247007 | 11/1975 | Fed. Rep. of Germany . | |
| 7605257 | 7/1976 | Fed. Rep. of Germany . | |
| 871754 | 7/1939 | France . | |
| 1101487 | 10/1955 | France | 301/9 TV |
| 666112 | 2/1952 | United Kingdom . | |

Primary Examiner—Russell D. Stormer
Attorney, Agent, or Firm—Body, Vickers & Daniels

[57] ABSTRACT

A track-adjusting wheel for farming tractors and the like, is disclosed, in which the screw connection of the adjustable wheel dish to the rim designed as a drop-well rim (Dw rim) is made via retaining brackets which are positively supported on the drop-well flanks in the axial direction and which are connected to the rim via welding seams extending in the peripheral direction of the rim. The positive connection absorbs the axial forces, so that the welding seams are relieved of these forces.

4 Claims, 2 Drawing Sheets

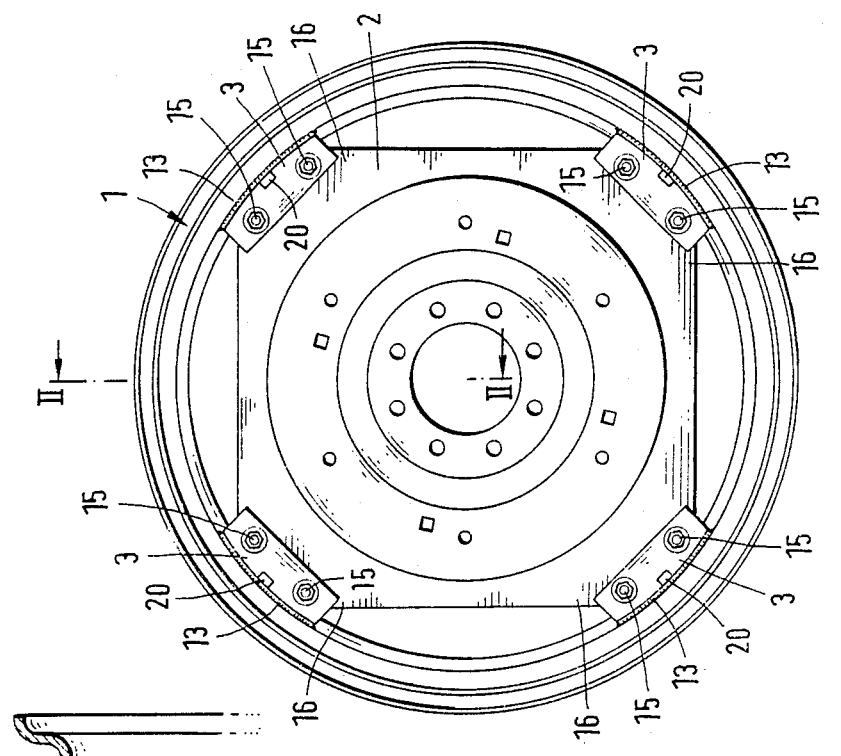
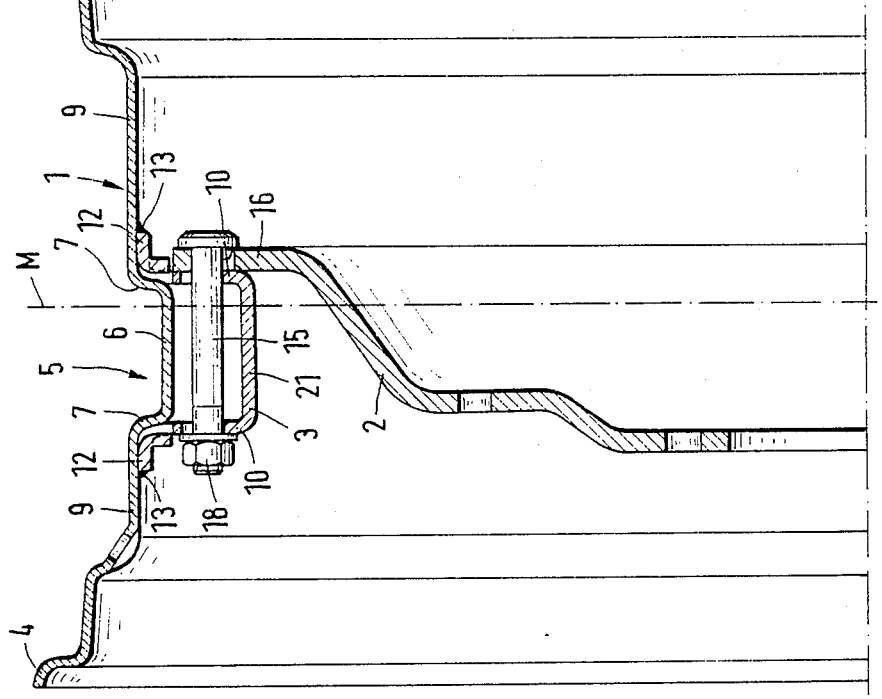

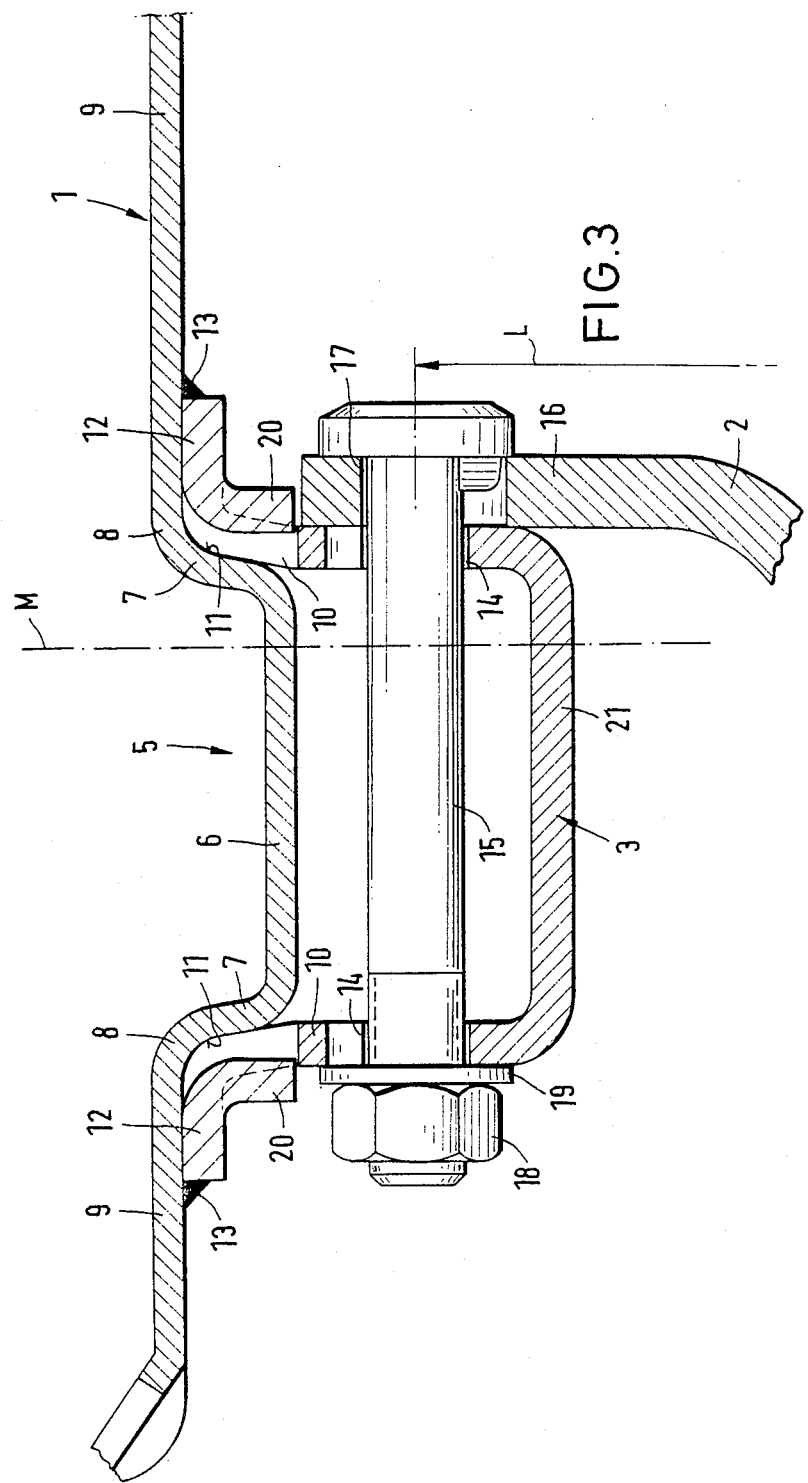

TRACK-ADJUSTING WHEEL

BACKGROUND OF THE INVENTION

1. FIELD OF THE INVENTION

The invention relates to a track-adjusting wheel especially for tractors and the like, having a wheel dish arranged releasably and shiftably on retaining brackets of the rim, which retaining brackets are distributed over the inner periphery of the rim and are of approximately U-shaped cross-section, and have on their legs aligned bolt holes for axial screws serving for fastening the wheel dish, and outwardly directed flanges which lay against the rim base and with which the retaining brackets are connected to the rim by means of welding seams extending in the peripheral direction of the rim.

Track-adjusting wheels are used for adjusting the track on farming tractors and also on other vehicles for agricultural and forestry purposes Conventional track-adjusting wheels have wheel dishes which can be connected to the wheel rim in different axial adjustment positions by means of fastening screws. At the same time the rims are equipped with welded-on retaining brackets which are distributed over their inner periphery and to which the multi-lobed wheel dish is connected by means of the screws. With the known track-adjusting wheels, various track adjustment possibilities, generally eight track settings, are obtained from the particular position of the rim relative to the wheel dish or of the wheel dish relative to the wheel-hub flange. With a track jump of generally 100 mm, the track of a tractor can therefore be varied over 700 mm.

2. DESCRIPTION OF THE PRIOR ART

Many designs for the retaining brackets serving for the screw fastening of the wheel dish have been proposed and used in the past, for instance U-shaped, angular or S-shaped retaining brackets of even so-called omega brackets. The known retaining brackets are connected to the rim by means of axial welding seams or by means of welding seams extending in the peripheral direction of the rim, but occasionally also by means of a combination of both welding seams (German Patent Specification 837,649, G.B. Patent Specification 666,112, German Patent Specification 2,247,007, German Utility Model 7,605,257 and European Patent Specification 0,025,677). In the past, however, there have also already been proposals to provide other types of connection, for example rivet or clamping connections, in order to connect the rim and the wheel dish. In one example of a known track-adjusting wheel, the rim is fixed to the wheel body by means of axial screws, eccentric bolts and clamping pieces along a continuous radial groove, or as a result of the pressing in of the rim base. Also, stop projections are arranged on the rim base in order to prevent rotation of the rim relative to the wheel body (U.S. Patent Specification 2,254,361).

It has also long been known to use for trackadjusting wheels and other wheels four-lobed wheel dishes which can be produced from square sheet metal blanks in a material-saving and therefore cost-effective way (French Patent Specification 871,754). On track-adjusting wheels, the screw fastening of the wheel dish to the rim is carried out at each of the four dish corners or dish lobes either by means of only a single fastening screw, or by means of a pair of screws, either single or double retaining brackets being provided at the fastening points (European Patent Specification 0,025,677).

Regardless of the many known designs of the retaining brackets, in the past these have always been welded to the rims in such a way that the axial and radial forces exerted on the wheel during use and the drive torque are transmitted via the connections of the welding seams. The extremely high wheel loads occurring during use and frequently acting as impact forces lead to considerable stresses and correspondingly pronounced deformation of the retaining brackets and consequently also to highly detrimental stresses being exerted on the welded joints, with the result that, under specific conditions of use of the tractors, the welding seams and/or the retaining brackets often break. A break of the welded joints cannot be reliably prevented by a reinforcement of the retaining brackets, which in any case involves an increased outlay in terms of production.

SUMMARY OF THE INVENTION

The object of the invention is, therefore, to provide a track-adjusting wheel which can be produced economically and which has stronger connections between the retaining brackets and the rim and therefore a stronger wheel-dish fastening as a whole, the welded joints at the same time being relieved of stress.

In a track-adjusting wheel of the type mentioned in the introduction, according to the invention this object is achieved because the rim is designed as a double drop-well rim and the retaining brackets are made with an inner leg spacing marginally less than or substantially corresponding to the drop-well outer width such that the brackets mate closely with the outer contour of the drop-well flanks and their drop-well radii, and are positively supported on the drop-well flanks by their legs in the axial direction of the track-adjusting wheel.

Accordingly, in the design of the track-adjusting, wheel according to the invention, a positive support of the retaining brackets on the drop-well flanks on the hub side of the rim is obtained, so that the forces exerted in the axial direction of the wheel, that is to say the axial forces, are absorbed as a result of the positive connection between the retaining brackets and the drop-well flanks. At the same time, the screw prestressing forces exerted on the wheel-dish/retaining-bracket/rim connection produce a non-positive connection between the retaining brackets and the drop-well of the rim which absorbs the forces acting radially and tangentially and arising from the wheel load, the drive and braking torques and the impact forces. As a result of this positive and non-positive connection, the welded joints are largely relieved of forces which otherwise are transmitted solely via the welding seams and the foot radii of the retaining brackets. This results in a greatly reduced and altogether more favorable stress on the retaining-bracket radii and the welding seams, so that breaks of the retaining brackets and welding seams can be avoided. Also, excessive deformations of the retaining brackets are prevented as a result of the lateral support of the retaining brackets on the drop-well flanks.

The double drop-well rim (known as a DW rim in wheel-building) which is used on the track-adjusting wheel according to the invention is preferably made asymmetric in terms of the position of the drop-well, such that the drop-well is offset axially relative to the rim center by an amount matching the track jump, so that one flank of the drop-well is at a shorter distance from the rim center than the other flank of the drop-well. In this rim, therefore, the position of the drop-well serving as lateral support for the retaining brackets is co-ordinated with the track adjustment dimensions, that is to say the track jump, so that eight track settings with an equal track jump of, for example, 100 mm can be obtained. Track adjustment wheels have been available in the art for some time. European patent 0025677 to Edwards illustrates a track adjustment wheel comprised of a rim, an inner disk and brackets interconnecting the rim and the disk. Edwards provides track adjustment in the conventional manner by allowing one to reverse the disk on the wheel hub, reverse the rim and bracket assembly on the disk and/or mount the rim and brackets on one side or the other of the central disk (see Edwards column 3, lines 36–55). The wheel described herein is adjustable as described in Edwards. The wheel dish 2 can be reversed on the hub, the rim, which has an attachment plane spaced from its central plane, can be reversed before mounting on the dish; and, the rim can be mounted on the inside (proximate to the vehicle body) or outside (away from the vehicle body) of the dish.

In the track-adjusting wheel according to the invention, the retaining brackets used are approximately U-shaped the mutual spacing of the two approximately parallel U-legs being matched to the drop-well width, in order to achieve the positive surface support on the drop-well flanks. Such retaining brackets can be produced conveniently from, for example, sheet metal. If necessary, however, the U-shaped brackets can also be equipped with stiffening means and the like, for example in the form of stiffening webs, tubular pieces and the like, which are inserted between the U-legs approximately parallel to the U-web. Such reinforced U-shaped brackets are known in track-adjusting wheels. Because the retaining brackets are connected to the rim at their axially outward-directed flanges via the welding seams extending in the peripheral direction of the rim, a position of the rim, a position of the welding seams which is favorable in terms of both stress and the execution of the welding work is also obtained.

The arrangement is advantageously such that the retaining brackets rest against the drop-well flanks under prestress by means of their legs. Thus the retaining brackets are produced so that the inner spacing of their two legs in a supporting region is somewhat less than the distance between the outer faces of the drop-well flanks, with the result that, when the retaining brackets are slipped onto the formed-out drop-well portion of the rim, the legs of the retaining brackets are pushed apart, that is to say the retaining brackets are widened elastically, so that they rest against the drop-well flanks with their legs under prestress. The bracing achieved in this way ensures a firm fit of the retaining brackets on the formed-out drop-well portion, whilst at the same time providing good surface contact; furthermore, it prevents the peripherally extending welding seams from being subjected to load by the axial screw forces when the screws fixing the wheel dish to the retaining brackets are tightened.

The invention makes it possible, furthermore, to have the screw fastenings for securing the wheel dish to the retaining brackets at a relatively short radial distance from the drop well of the rim, this being beneficial in terms of strength. Accordingly the bolt holes of the retaining brackets are appropriately arranged so that the screws are at the desired short radial distance from the base of the drop-well of the rim. Tests have shown that the ratio of the inside diameter of the drop-well of the rim to the screw-hole circle of the wheel dish should be at most approximately 1.06.

Moreover, for the purpose of economical production of the track-adjusting wheel according to the invention, it is advantageous if, as is known, the retaining brackets re designed as double brackets for the connection of a four-lobed wheel dish which can be produced from a simple square metal sheet in a material-saving and therefore cost-effective way.

It is recommended, furthermore, to provide on the legs of the retaining brackets local pressed-out portions or the like which serve as centering members for the wheel dish to improve the true running of the mounted which and which, above all, make it easier to mount the wheel dish.

BRIEF DESCRIPTION OF THE DRAWINGS

A preferred embodiment of the invention is described below by way of non-limitative example with reference to the accompanying drawings, in which:

FIG. 1 shows a view of a track-adjusting wheel according to the invention;

FIG. 2 shows the track-adjusting wheel according to FIG. 1 in a radial section along the line II—II of FIG. 1;

FIG. 3 shows the region of fastening of the wheel dish to the drop well of the rim of the track-adjusting wheel according to FIGS. 1 and 2 on a larger scale and in radial section.

DETAILED DESCRIPTION OF THE INVENTION

The track-adjusting wheel according to FIGS. 1 to 3, designed as a disk wheel, comprises in its main parts the rim 1 for carrying a tire (not shown), the wheel dish 2 as a connecting piece between the rim and wheel hub, and retaining brackets 3 which serve as the releasable and changeable connection of the wheel dish 2 to the rim 1.

As shown best in FIG. 2, the one-part rim 1 is designed as a double drop-well rim (DW rim), here as a double drop-well rim asymmetric relative to the mid-axis M of the rim and having a drop-well 5 which is off-set relative to the rim center in the axial direction of the track-adjusting wheel, that is to say in the direction of the one rim horn 4. The base is designated by 6 and the two side flanks by 7. The drop-well flanks 7 merge into the surface 9 of the drop-well of the rim with a curvature, denoted the drop-well radius 8. The two drop-well flanks 7 form with their outer faces lateral bearing and supporting faces for the retaining brackets 3.

The retaining brackets 3 of roughly approximate U-shaped cross-section are supported by means of their two legs 10 on the outer faces 11 of the drop-well flanks 7, with the result that a positive connection of the retaining brackets 3 to the rim 1 is obtained in the axial direction. As shown especially in FIG. 3, the arrangement is such that the free end regions of the legs 10 of the retaining brackets 3 fit snugly with the outer contour of each of the drop-well flanks 7 and the drop-well radii 8, thereby ensuring a large-surface support for the legs 10 on the respective faces of the rim 1. The ends of the two legs 10 of brackets 3 are bent to form outwardly directed flanges 12 which are supported superficially on the inner periphery of the rim and which themselves are connected at the end to the rim 1 via welding seams 13. The welding seams 13 accordingly extend in the direction of the rim periphery essentially over the entire peripheral length of the retaining brackets 3 or more specifically their legs 10.

The retaining brackets abutting against the drop-well flanks 7 are under prestress as a result of pressure exerted against two legs 10. During production of the retaining brackets 3, the inner spacing of the two legs 10 is set so that it is somewhat less in the supporting region than the outer spacing of the bearing faces of the drop-well flanks 7. Accordingly, when the retaining brackets 3 are pressed onto the formed-out drop-well portion from inside their legs 10 are bent out elastically to a certain extent, thus ensuring the surface prestress. The retaining brackets 3 are subsequently fixed to the rim 1 by means of the welding seams 13.

The approximately U-shaped retaining brackets 3 have on their two legs 10, bolt holes 14 for axial screws 15, by means of which the wheel dish 2 is connected to the brackets in the different track-setting positions. The wheel dish 2 itself has corresponding bolt holes 17 on its dish lobes 16 which rest laterally against the retaining brackets 3. 18 denotes the nuts which are screwed onto the screws 15 and which are supported via the washers 19 against the opposite leg 10. Because the legs 10 are supported on the faces 11 of the drop-well flanks 7 under prestress, the welding seams 13 extending in the peripheral direction of the rim 1 are not adversely subjected to load by the axial screw forces.

The arrangement is preferably such that the fastening screws 15 are at as short a radial distance as possible from the innermost drop-well base 6. At the same time, the ratio of the inside diameter of the drop-well of the rim (at the drop-well base 6) to the screw-hole circle L should at most be equal to approximately 1.06.

As shown in FIG. 1, the wheel dish 2 is a four-lobed dish, the four lobes 16 of which are arranged at the corners of the dish of square contour. Such a wheel dish can be produced from square metal sheets in a material-saving way. Located at each corner of the dish 2, that is to say, on each dish lobe 16, is a retaining bracket 3 which is designed as a double bracket, that is to say has on its legs 10 two pairs of holes 14 offset relative to one another in the peripheral direction of the rim 1 and intended for two screws 15. The wheel dish 2 is accordingly connected to the four retaining brackets 3 of the rim 1 by means of eight screws 15.

Each of the retaining brackets 3 has, approximately in its center, a centering member 20 for centering the wheel dish 2 during mounting of the latter. As shown best in FIG. 3, the centering members 20 comprise local pressed-out portions of the legs 10 of retaining brackets 3. These pressed-out portions can be made by giving the legs approximately U-shaped notches at the respective points, whereupon the tongues detached from the leg structure on three peripheral sides as a result of these notches are pressed outwards from the leg plane in order to form the centering members 20. FIG. 3, like FIG. 1, shows a section through the retaining brackets 3 in the plane of the centering members 20. The latter form centering stops which interact with the outer peripheral faces of the lobes 16 of the wheel dish 2.

The illustrated retaining brackets 3 according to the invention are preferably produced as U-shaped brackets from sheet metal. They can be equipped with reinforcements or stiffening means and the like. For example the two legs 10 of the retaining brackets 3 can be supported relative to one another and stiffened between the U-web 21 and the base 6 of the drop-well by means of inserted or welded-in reinforcing webs or tubular pieces through which the screws 15 can be introduced.

It can be seen that, as a result of the positive connection of the retaining brackets 3 to the formed-out drop-well portion of the rim 1, the peripherally extending welding seams 13 are relieved of the axial wheel forces, and that, altogether, the connection of the wheel dish 2 to the rim 1 is thereby made more favorable and more stable in load terms. It would also be conceivable to connect the retaining brackets 3 to the rim 1 at their legs 10 or the flanges 12 in another way, for example by spot-welding or riveting, although an arc-welding seam connection is generally preferable. As mentioned, the position of the drop-well 6 on the rim is co-ordinated with the adjustment dimension, that is to say the track jump, so that preferably eight track settings with adjustment steps of equal size are obtained.

It goes without saying that the retaining brackets 3 can be of different design and, as is known, can also comprise smaller individual brackets for only a single fastening screw 15. The number of retaining brackets 3 on the periphery of the rim 1 can differ according to the particular wheel dish 2, although as mentioned, a four-lobe wheel dish with two screw bolts 15 on each lobe is preferably used.

I claim:

1. A track adjusting wheel having an axis and a central plane perpendicular to said axis for tractors and the like comprising:
a double drop-well rim having a generally annular body and an inner drop-well offset from said central plane, said inner drop-well comprising an annular base, two drop-well flanks having axially outwardly facing surfaces approximately parallel to said central plane spaced a first fixed axial distance apart and two inner drop-well radii connecting said inner drop-well to said body;
retaining brackets of approximately U-shaped cross section comprising legs having axially inwardly facing surfaces approximately parallel to said central plane spaced a second fixed axial distance apart, said second axial distance being equal to or less than said first axial distance whereby said legs are tightly fitted against said drop-well flanks outwardly facing surfaces, radial outward, ends radial inward ends and bolt holes adapted to receive axially extending screws, axially extending flanges at said radial outward ends of said legs, said flanges abutting against and welded to said body of said rim, and a base connecting said radial inward ends of said legs; and,
a wheel dish fastened to said retaining brackets by axially extending screws through said bracket bolt holes.

2. The track adjusting wheel of claim 1 wherein said bolt holes are arranged in a circle around said wheel axis, said circle having a bolt hole circle diameter, said inner drop-well base has an inner drop-well base inside diameter and the ratio of said inner drop-well base inside diameter to said bolt hole circle diameter is approximately equal to or less than 1.06.

3. The track adjusting wheel of claim 1 wherein said wheel dish is approximately rectangular end said wheel is provided with four retaining brackets, each said retaining bracket being provided with two bolt holes.

4. The track adjusting wheel of claim 3 wherein each said retaining bracket is provided with a centering member extending outwardly from the peripheral center of each said leg adapted to guide said rim to a centered true position when assembled to said dish.

* * * * *